United States Patent [19]

Berbeco

[11] Patent Number: 4,596,668

[45] Date of Patent: Jun. 24, 1986

[54] CONDUCTIVE SURFACE COATING COMPOSITION

[75] Inventor: George R. Berbeco, W. Newton, Mass.

[73] Assignee: Charleswater Products, Inc., West Newton, Mass.

[21] Appl. No.: 547,436

[22] Filed: Nov. 1, 1983

[51] Int. Cl.$^4$ ............................................. H01B 1/00
[52] U.S. Cl. .................................... 252/500; 524/911; 524/913; 524/914
[58] Field of Search ............................... 252/500, 518; 260/DIG. 20, DIG. 17, DIG. 18; 524/912, 913, 910, 911, 555; 525/329.9, 328.2, 328.8; 526/304

[56] References Cited

U.S. PATENT DOCUMENTS

| | | | |
|---|---|---|---|
| 2,579,375 | 12/1951 | Eisen | 260/DIG. 20 |
| 2,836,517 | 5/1958 | Gruber et al. | 524/913 |
| 3,445,440 | 5/1969 | Susi et al. | 524/913 |
| 3,658,744 | 4/1972 | Brindell et al. | 524/912 |
| 3,819,656 | 6/1974 | Barie et al. | 260/DIG. 20 |
| 3,929,743 | 12/1975 | Sramek | 524/914 |
| 3,933,779 | 1/1976 | Baron et al. | 524/913 |
| 4,004,054 | 1/1977 | Audykowski et al. | 524/912 |
| 4,011,176 | 3/1977 | Saunders et al. | 252/500 |
| 4,025,704 | 5/1977 | Trevoy | 252/501 |
| 4,084,034 | 4/1978 | Jansma et al. | 252/500 |
| 4,313,978 | 2/1982 | Stevens et al. | 524/913 |
| 4,382,990 | 5/1983 | Coates | 524/912 |

*Primary Examiner*—Josephine L. Barr
*Attorney, Agent, or Firm*—Richard P. Crowley

[57] ABSTRACT

An electrically-conductive surface-coating composition for use in application as a floor coating to provide electrostatic discharge protection which composition comprises: an emulsion of a film-forming water-soluble low-molecular-weight polyampholyte polymer containing free carboxylic groups and carboxylic amino ester groups and an effective amount of an antistatic agent such as a quaternary ammonium salt to provide a floor surface which has a surface resistance of about $10^9$ ohm/square or less.

20 Claims, No Drawings

CONDUCTIVE SURFACE COATING COMPOSITION

BACKGROUND OF THE INVENTION

An effective static control system for the protection of materials subject to damage by static electricity, such as electronic components must encompass the entire area wherein the electronic components may be subject to static charge, that is, from the manufacturing facility or from receiving through field service areas. Static electricity is generated by triboelectric charging, that is, the rubbing or movement of one material against another. Floor surfaces, particularly in the manufacturing area, are subject to such charge generation by virtue of the movement of material and people handling equipment including hand carts, pallets, trucks and trays, as well as in the assembly areas and shipping areas. Often little attention is given to the electrostatic discharge control of the floor or surface area which is adjacent to the static-controlled work station. Often an assumption is made that a worker will always be grounded with a wrist strap and, therefore, a grounded floor surface area is unnecessary. However, supervisors and nonworking station personnel and next-shift workers and others may interact with others at an electrically-static discharge-safe work area without the proper wrist wrap or other grounding. In addition, objects moved across the floor surfaces, such as carts, can generate substantial static charges and typically have no means for the electrostatic charge to dissipate. Conventional floor surfaces and floor finishes do not prevent charge generation or provide a means for charge dissipation or removal.

Therefore, it is desirable to provide a surface composition particularly for use as a floor composition in static control areas so as to obtain a floor surface with the ability to discharge a static charge rapidly, a low propensity to generate a charge by movement across the floor, and yet provide a clean, high-gloss, hard surface with durability for foot traffic.

SUMMARY OF THE INVENTION

The invention relates to a synthetic polyampholyte polymer composition suitable for use as a floor finish, to a method of preparing the polyampholyte polymer composition, and to the use of such compositions as floor finishes to prevent the generation of a static electric charge and which floor compositions have an electrical surface resistivity of about less than $10^9$ ohm/square.

The invention comprises a film-forming synthetic polyampholyte polymeric composition as an emulsion which contains an effective antistatic amount of an antistatic agent, which composition, employed as a surface coating, provides electrostatic discharge protection particularly on floor surfaces and is characterized in that it will dissipate the static charges on personnel walking on said floor to zero in less than about 0.1 seconds and prevents the generation of static charge by personnel walking on the substrate protected with the composition of the invention. The coating composition provides an effective electrically-conductive finish, typically up to 60 days or more in normal traffic areas and provides a conductive ground floor to discharge entering personnel. Surfaces covered with the composition of the invention have electrical resistance of $10^9$ ohm/square or less. The employment of the composition of the invention by the electrostatic protection, particularly to semiconductive devices and in the manufacturing areas involving such semiconductive devices.

It has been discovered that the synthetic composition of the invention containing the antistatic agents are effective in replacing conductive mats and conductive tile with a high-gloss attractive finish on existing floor surfaces at a low cost. The surface compositions of the invention are easily applied and easily maintained, and provides for superior static-control properties, that is, zero-charge generation and avoids the possibility of slipping which is present with conductive floor mats unless they are taped to the floor. The composition of the invention deposits films on surfaces which have outstanding physical properties and also electric properties due to the intermolecular forces resulting from the present of both anionic and cationic groups in the polyampholyte ionic polymer employed in combination with the chemical composition of the antistatic agents used.

The polymer compositions of the invention comprise an aqueous colloidal latex emulsion, typically contains from about 5 to 30% of the polyampholyte polymer and preferably about 10 to 20% of the polyampholyte polymer. The polymeric emulsion also comprises from about 0.1 to 20% for example 0.5 to 10, and preferably about 4 to 15% by weight of the antistatic agent. The conductive water-soluble polymeric compositions of the invention are simply prepared by mixing the antistatic agent into the latex emulsion containing the low-molecular-weight synthetic polyamopholyte polymer. The water-soluble polyampholyte polymers useful in the antistatic compositions of the present invention are prepared as set forth in U.S. Pat. No. 3,929,743, issued Dec. 30, 1975, and hereby incorporated by reference. These water-soluble polyampholyte polymers are prepared by reacting a low-molecular-weight copolymer which has pendant carboxylic acid groups and a aziridine compound in an amount sufficient to iminate only a portion of the carboxylic acid groups and the remaining carboxylic acid groups are then neutralized with a base, such as a volatile ammonia to render the polymer water soluble. Thus, the resulting aqueous emulsions contain a low-molecular-weight polyampholyte polymer having a plurality of free carboxylic groups and a plurality of carboxylic amino ester groups. The polymer is capable of dissolving in water upon reaction with a base. Typically the polyampholyte has a molecular weight ranging from 10,000 to 200,000 and the pendant carboxylic amino ester groups have the formula:

with each of the $R^1$, $R^2$, and $R^3$ being hydrogen or a lower alkyl group containing 1–7 carbon atoms. The copolymer comprises a carboxylic acid-containing monomers, such as methylacrylic acid and a "soft", "hard" or "hydrophilic" monomer. A typical soft monomer would comprise ethyl acrylate and butyl acrylate, where a hard monomer would comprise methyl methacrylate, while the hydrophilic monomer would comprise 2-hydroxyethyl acrylate or methacrylate. The neutralizing agent employed is typically ammonium in order to obtain the desired degree of water solubility. The film-forming polyampholyte composition may also incorporate a suitable cross-linking agent, such as a polyvinyl metal iron typically with ammonium or a volatile amine. Latex emulsions containing the polyampholyte polymers have been discovered by others to be suitable for use for finishes and for hair spray products.

The antistatic agent employed with the ampholyte polymer to provide a polymer composition with a low electrical conductivity, essentially a zero electrostatic discharge for protection of the device subject to static damage comprises quaternary compounds. A wide variety of quaternary compounds are suitable for use in the polyampholyte polymer compositions of the invention. Such quaternary ammonium compounds would include those compounds which are water soluble and which are compatible with the polyampholyte polymer composition. Typically, the quaternary ammonium compounds comprise those quaternary compounds containing one or more hydrocarbon groups on the nitrogen atom, such as alkyl, alkylene and alkoxylated groups, and combinations thereof, and often with a long-chain fatty-acid group. Quaternary compounds which act as textile softeners have been found to be particularly suitable for use in the invention. The anionic group of the quaternary ammonium compound may vary, but generally is an acid salt group such as a halide, like a chloride or bromide, or a weak acid, such as an acetate or a hydroxide group.

One class of suitable quaternary ammonium compounds would include the mono, di or tri alkyl, such as $C_1$–$C_4$ alkyl, for example, methyl, ethyl, and propyl, and typically with other groups such as benzyl, and a fatty-acid group, such as oleyl, stearyl, cetyl and the like. But typically the quaternary ammonium compounds would comprise quaternary ammonium halides, such as N-alkyl dimethyl benzyl ammonium chloride wherein the N-alkyl would comprise $C_{12}$–$C_{18}$ groups ranging from about 5 to 70% N-alkyl dimethyl dichloro benzyl ammonium chloride, stearyl dimethyl benzyl ammonium chloride, a di-alkyl methyl benzyl ammonium chloride, n-alkyl dimethyl benzyl ammonium chloride, cetylpyridinium chloride or bromide and ethoxylated quaternary ammonium compounds such as methyl tri $C_8$–$C_{10}$ ammonium chloride. Such quaternary ammonium compounds are representative only of the quaternary ammonium compounds which may be employed for antistatic purposes in the practice of the invention.

Such quaternary ammonium compounds should be employed in an amount effective to provide for electrical conductivity of $10^9$ or less, and to provide for the dissipation of static charges on personnel to zero in less than 0.1 seconds, or preferably, the inability of personnel to generate any static charge by walking on a surface containing a thin-film coating of the polymeric compositions of the invention. The quaternary ammonium compounds suitable for use may be used alone or in conjunction with other antistatic agents and other additives, such as surfactants, polyalkylene glycols, such as polyethylene glycols, polypropylene glycols, dispersing agents, fillers, wax, other water-soluble resins, buffering agents and thickeners, and other additives.

The polymeric compositions of the invention are suitable for use in a wide variety of applications wherein electrical conductivity is desired. Typical applications would be the use of a latex emulsion composition as a floor composition on any hard surface or sealed floor material which would include but not be limited to vinyl, vinyl asbestos, linoleum, rubber, asphalt, or sealed or painted wood, terrazzo concrete, and on surfaces such as tabletop surfaces, particularly laminate-type surfaces. In addition, the latex emulsion compositions of the invention are suitable for use on textile fabrics as a treatment or spray to reduce antistatic charges or on aqueous emulsion-type hairspray. In addition, the polymer composition of the invention comprising the polyampholyte water-soluble polymer in combination with the quaternary ammonium antistatic agent may be admixed, blended, or formed together to provide a polymer for use in a solvent solution or for extrusion into antistatic mats, rods, cables, or in other form.

The polymeric compositions of the invention may be usefully employed in computer rooms, clean rooms, electronic assembly, packaging, and manufacturing areas, hospital operating rooms and other areas where typically an antistatic floor mat is employed and where zero discharge is important.

In use, the latex polymer compositions of the invention may be employed as conductive floor finishes to provide outstanding antistatic control properties along with high gloss, and high durability of a high performance floor finish. In use, the floor is prepared by stripping, for the removing of any heavy buildup of contaminated wax, and the removal of foreign particulate matter and loose dirt. Typically, the floor is cleaned using an alkaline-type stripping solution, such as one containing ammonium and detergent; thereafter, when the floor is stripped and dried, the latex polymer composition of the invention is merely applied to the floor, typically using a mop, or a sponge, with one or more coats permitting the coats to dry between the applications. If desired, the floor finish may be buffed, but this is not required. The life of the antistatic coating may be extended by additional applications, with time, of the latex polymer compositions of the invention. Generally, the latex emulsion composition applied as a floor finish is a high-molecular-weight polymer catalyzed colloidal emulsion which contains a suitable cross-linking agent such as a polyvalent metal, all together with ammonia incorporated into solution to provide for cross-linking and durability to the floor finish. The floor finish provided not only dissipates static charge, but it prevents personnel from generating a static charge when walking on the floor, and, therefore, actually prevents triboelectric charging of walking personnel. Therefore, if a person enters an area having a floor finish of the polymeric composition and carrying a static charge, the treated floor finish will discharge the person and prevent the accumulation of new static charge generation.

The invention will be described for the purposes of illustration only in connection with specific preferred embodiments; however, it is recognized that other people skilled in the art may make various modifications, charges, additions and improvements thereon, all falling within the spirit and scope of the invention.

DESCRIPTION OF THE EMBODIMENTS

EXAMPLE 1

A film-forming polyampholyte polymer emulsion composition is prepared by adding a quaternary ammonium compound as an antistatic agent to a water colloidal-type emulsion of a polympholyte polymer composition to provide a composition having the formulation:

| Ingredients | Parts by Weight |
| --- | --- |
| 1. Polyampholyte polymer (copolymer of methacrylic acid, butyl acrylate, and methyl methacrylate in a ratio of 20/40/40 and 25–70% of the carboxylic acid groups reacted with ethylene imine) | 14.0 |

-continued

| Ingredients | Parts by Weight |
| --- | --- |
| 2. Surfactant - Triton X100 (a trademark of Rohm & Haas Co. for a non-ionic surfactant) | 0.5 |
| 3. Carbitol (a trademark of Union Carbide Corporation) | 2.5 |
| 4. Cross-linking agent (optional), e.g., Zinc (Zinc acetate variable as to number of free carboxylic groups) | 0.4 |
| 5. Ammonium hydroxide to pH | 9.0 |
| 6. n-alkyl dimethyl benzyl quaternary ammonium chloride | 1.0 |
| 7. Water | Balance (total non-volatile content about 16.0 wt. %) |

EXAMPLE 2

The formulation of Example 1 wherein the antistatic agent comprises an n-alkyl $C_{14}$–$C_{18}$ dimethyl ethyl benzyl ammonium chloride.

EXAMPLE 3

The formulation of Example 1 wherein the antistatic agent comprises a cetylpyridinium chloride. This formulation in addition to antistatic properties, provides for antibacterial protection to the resulting floor finish.

EXAMPLE 4

A general latex formulation suitable as a floor finish having the formulation:

| Ingredients | Parts by Weight |
| --- | --- |
| 1. Polyampholyte copolymer 16–40% wt acid monomer 60–84% wt hard, soft or hydrophilic monomer containing free carboxylic acid and amino ester groups and water soluble on reaction with ammonia | 5–30 |
| 2. cross-linking agent - polyvalent metal ion and ammonia 0.05 to 0.5 equivalents per equivalent of carboxylic acid in copolymer before imination | varies |
| 3. Surfactant | 0.1–1 |
| 4. Base - ammonia to | 8.5–9.5 |
| 5. Additives | 0.1–1.0 |
| 6. Quaternary ammonium salt | 0.5–20 |

EXAMPLE 5

The formulations of Examples 1 and 2 if tested to determine the static charge generation by walking on floor treated with a coating of the formulation on vinyl tile would provide zero-static charge. A formulation of this invention when tested to determine the amount of static charge generated provide the following results:

Equipment needed: One "test person" with leather sole shoes and a static locator (e.g., Charlewater CP901 Static Meter).

Procedure: The "test" person walks on the floor area for 10 to 30 paces. He holds his hand forward of his body, 2" away from the static locator (or as described in the static locator instructions). The charge on the body of the person is thereby measured. (Note that the clothing should not be measured since it varies with people, and can be an independent static generator).

| Results: | Charge Generated |
| --- | --- |
| Formulation coated and protected vinyl tile floor | zero |
| untreated vinyl tile | 1000 to 2000 volts |
| waxed tile | 2000 to 5000 volts |
| topical antistat on tile | 2000 to 4000 volts |
| "Antistatic Wax" on tile | 2000 to 5000 volts |

EXAMPLE 6

A formulation of the invention, such as the formulation of Examples 1 and 2, was tested to determine the ability of an electrostatic discharge (ESD) floor area to discharge a static charge. The test and test results were as follows:

Equipment needed: A "Rupe Fixture" or two parallel electrodes 2" long, and 2" apart (forming a square) a megohmmeter e.g., HP 4329A High Resistance Meter.

Procedure: Place the fixture securely on the floor, and measure electrical resistance using 100 volts input on the megohmmeter. Measurement is made of surface electrical resistivity. A safe level is less than $10^9$ ohm/square - this results in charge dissipation from 5000 volts to zero in about 0.08 seconds.

Results:
Formulation protected vinyl tile floor - less than $10^9$ ohm/sq.
untreated vinyl tile - $10^{13}$ ohm/sq.
wax treated tile $10^{14}$ ohm/sq.
topical antistat on tile - $10^{13}$ ohm/sq.

EXAMPLE 7

Further tests were conducted to determine the effectiveness of the antistatic floor finish formulation of the invention. This test was limited to hard floor surfaces. A brief industry survey revealed that the typical working floor surfaces used in ESD safe areas were the following: vinyl asbestos tile with or without floor wax, conductive vinyl tile, conductive (carbon impregnated) floor mats, multilayer conductive mats, and antistatic (soap or oil filled) floor mats. ESD precautions on floor surfaces vary. The largest usage of ESD safe floor material is in the assembly area, in which conductive tile, and conductive mats are utilized.

To better understand the phenomenon to be considered in ESD floor surfaces, measurements were made of the following characteristics; static charge decay, electrical surfaces resistivity, and static charge generation. Assumptions were made in testing as to the types of shoe materials worn. Shoe materials include neolite and leather soles which vary considerably in their triboelectric character in charge generation. Also, the relative humidity was controlled, but this may not reflect actual conditions of the shoe/floor interface due to sweat (moisture) from the human foot.

Static charge decay measurements were made on clean floor surfaces, in accordance with Federal Test Method Standard 101B, Method 4046. These results are shown in Table 1. Floor surfaces were charged to 5000 volts positive and negative in the surface grounded, and the time to dissipate the charge to zero measured.

The surface electrical resistance of the alternative floor surfaces was measured using an HP4341 High Resistance Meter at 100 volts input, and an ETS concentric circle "Rupe" fixture (ASTM D257).

Static charge generation of various floor surfaces was examined using the AATCC (American Association of Textile Chemists and Colorists) Test Method 134-1979 (Electrostatic Propensity of Carpets). This test method involves the measurement of charge generated by a person walking on a floor surface, with chrome leather or neolite shoe soles and heels. A grounded metal plate is placed under 27"×36" tile on plywood floor, preconditioned at a stated relative humidity. Voltage generated is measured with an electrometer and chart recorder.

The results of the static decay tests of charged floor surfaces suggest that all but the "antistatic" surfaces are acceptable. Conventional vinyl asbestos tile with or without surface treatment provides reasonable static charge decay characteristics. Both conductive polyethylene and conductive multilayer mats are provided rapid static discharge. A conventional vinyl asbestos tile floor with or without wax or typical antistat provided rapid static discharge under this test procedure. Covering such a floor with conductive mats improves discharge performance, covering with antistatic mats descreases the normal floor's performance under these conditions. The best results are achieved by the formulation of the invention. Other floor treatments were no better than the tile alone. Also, the aluminum plate (which is highly conductive) discharged a static charge rapidly. The surface electrical resistance of the test surfaces was consistent with prior relationships, that is, at about $10^9$ ohm/square or less, adequate and rapid charge decay found.

The relevancy of the charge decay and electrical resistance test is brought into question by the AATCC step method. From the data presented a highly conductive floor surface does not reduce or eliminate charge generation. Thus, personnel walking on a conductive floor can generate substantial static failures from walking on conductive surfaces.

The comparative results of the various floor surfaces is summarized in Table I. The formulation of the invention were the best; not only does this treated floor surface provide for rapid static discharge, it also permits zero static charge generation for personnel walking on the floor.

TABLE I

| Example 1 | STATIC DECAY TIME | CHARGE GENERATION | RESISTIVITY | TOTAL DISCHARGE OF PERSONNEL |
|---|---|---|---|---|
| Ideal | 0.1 sec | ZERO | $10^9$/sq | 1 sec |
| Formulation on tile | 0.05 sec | ZERO | $10^9$/sq | 1 sec |
| Vinyl Asbestos tile (untreated) | 0.36 sec | 2 to 3.5 KV | $10^{13}$/sq | 10 sec |
| Waxed tile (untreated) | 0.90 sec | 4 t 7 KV | $10^{13}$/sq | 10 sec |
| Topical Antistat on tile (untreated) | 0.36 sec | 0.5 to 1.2 KV | $10^{11}$/sq | 10 sec |
| Conductive Tile or Mats | 0.01 to 0.1 sec | 2 to 4 KV | $10^6$ to $10^9$/sq | 1 sec |

What is claimed is:

1. An aqueous emulsion composition for use in coating a surface to provide electrostatic protection, which composition comprises:
   (a) a film-forming water-soluble acrylate polyampholyte copolymer, which copolymer is prepared by reacting an acrylic acid monomer with a hard, soft, or hydrophilic acrylic monomer, and which copolymer contains amino ester groups and carboxylic acid-base neutralized groups, the copolymer present in an amount of from about five to thirty percent by weight of the composition; and
   (b) a quaternary ammonium compound in an effective antistatic amount to form a thin dry antistatic coating from the composition which coating has an electrical conductivity of about $10^9$ ohms/square or less.

2. The composition of claim 1 wherein the polyampholyte copolymer contains ammonium neutralized carboxylic groups as the carboxylic acid-base neutralized groups.

3. The composition of claim 1 wherein the polyampholyte copolymer comprises a copolymer prepared from methacrylic acid, as the acid monomer and from butyl acrylate, and methyl methacrylate with twenty-five to seventy percent of the carboxylic acid group reacted with ethylene imine and the remaining free carboxylic acid groups neutralized with ammonium hydroxide.

4. The composition of claim 1 wherein the quaternary ammonium compound comprises cetyl pyridinium chloride or bromide.

5. The composition of claim 1 which forms a thin dry antistatic coating from the composition which coating has an electrostatic discharge to zero in less than about 0.1 seconds.

6. The composition of claim 1 which includes a crosslinking amount of a polyvalent metal ion.

7. The composition of claim 6 wherein the polyvalent metal is zinc.

8. The composition of claim 6 wherein the copolymer comprises a copolymer prepared by reacting an alkyl methacrylate, an alkyl acrylate and methacrylic acid, and the copolymer reacted with an ethylene imine to provide amino-ester groups and then the remaining free carboxylic acid groups of the copolymer reacted with a base compound to provide a water-soluble film-forming polyampholyte copolymer.

9. The composition of claim 1 wherein the antistatic agent comprises from about 0.5 to 20 wt percent of the emulsion composition.

10. The composition of claim 1 wherein the antistatic agent is an n-alkyl di $C_1$-$C_3$ quaternary ammonium salt.

11. The composition of claim 1 wherein the antistatic agent is an n-alkyl dimethyl benzyl quaternary ammonium salt.

12. A coated substrate which has been coated with the emulsion composition of claim 1 to form a thin dry antistatic coating having an electrical resistivity of less than about $10^9$ ohm/square and a zero electrostatic discharge to zero in less than about 0.1 seconds.

13. The aqueous emulsion composition for use in preparing an electrical conductive substrate coating which substrate composition comprises:
  (a) an acrylate-methacrylate polyampholyte copolymer prepared by reacting methacrylic acid with an alkyl acrylate monomer and an alkyl methyacrylate monomer to form a low molecular weight copolymer with free carboxylic acid group, the reaction carried out in the presence of a cross-linking amount of a polyvalent metal ion as a cross-linking agent and reacting ethylene imine with from about twenty-five to seventy percent of the free carboxylic acid groups and neutralizing the remaining free carboxylic acid groups with ammonium hydroxide, the copolymer present in an amount of from about five to thirty percent by weight of the composition; and
  (b) an alkyl-benzyl quaternary ammonium salt in an effective antistatic amount of from about 0.5 to 10 percent by weight of the composition to form a thin dry coating of the composition which has an electrical conductivity of about $10^9$ ohms/square or less and has an electrostatic discharge to zero in less than about 0.1 seconds.

14. A floor coated substrate which has been coated with the composition of claim 5 to form a thin dry coating of the emulsion composition.

15. The composition of claim 1 wherein the copolymer is prepared by reacting from about sixteen to forty percent by weight of the acrylic acid monomer with from about sixty to eighty-four percent by weight of the hard, soft, or hydrophilic acrylic monomer.

16. The composition of claim 1 wherein the acrylic acid monomer is methacrylic acid.

17. The composition of claim 1 wherein the soft acrylic monomer is an alkyl acrylate monomer.

18. The composition of claim 1 wherein the hard acrylic monomer is methyl methacrylate.

19. The composition of claim 1 wherein the hydrophilic acrylic monomer is 2-hydroxy-ethyl acrylate or methyacrylate.

20. The composition of claim 1 wherein the composition includes polyalkylene glycols.

* * * * *